United States Patent [19]

Akai et al.

[11] Patent Number: 4,959,184
[45] Date of Patent: Sep. 25, 1990

[54] METHOD OF PRODUCING SKIN-COVERED FOAMED PLASTIC ARTICLE

[75] Inventors: Mikio Akai; Masami Mori, both of Ayase, Japan

[73] Assignee: Ikeda Bussan Co., Ltd., Ayase, Japan

[21] Appl. No.: 260,218

[22] Filed: Oct. 20, 1988

[30] Foreign Application Priority Data

Oct. 31, 1987 [JP] Japan .................................. 62-276811

[51] Int. Cl.⁵ ............................................. B29C 67/22
[52] U.S. Cl. ................................. 264/40.3; 264/46.4; 264/46.6
[58] Field of Search ...................... 264/40.3, 46.6, 46.4

[56] References Cited

U.S. PATENT DOCUMENTS

| 3,929,948 | 12/1975 | Welch et al. | 264/45.5 |
| 3,989,781 | 11/1976 | Chant | 264/257 |
| 4,208,368 | 6/1980 | Egli | 264/45.5 |
| 4,278,624 | 7/1981 | Kornylak | 264/51 |

FOREIGN PATENT DOCUMENTS

| 58-29633 | 2/1983 | Japan | 264/46.6 |
| 58-185235 | 10/1983 | Japan | 264/46.4 |
| 61-125816 | 6/1986 | Japan | 264/46.4 |

Primary Examiner—Sam Silverberg
Assistant Examiner—Allan R. Kuhns
Attorney, Agent, or Firm—Foley & Lardner, Schwartz, Jeffery, Schwaab, Mack, Blumenthal & Evans

[57] ABSTRACT

A method of producing a skin-covered foamed plastic article, which includes preparing a lower mold which has a cavity formed therein; putting a bag-shaped outer skin member into the cavity, the skin member having a porous inner layer; pouring a foamable material for the foamed plastic article into the bag-shaped outer skin member; and controlling a pressure in the cavity in such a manner that the inner layer becomes saturated to a predetermined degree during curing of the material.

9 Claims, 1 Drawing Sheet

METHOD OF PRODUCING SKIN-COVERED FOAMED PLASTIC ARTICLE

BACKGROUND OF THE INVENTION

1. Field of the Invention

The present invention relates in general to a method of producing a skin-covered foamed plastic article, and more particularly to a method of producing the article, which generally comprises by steps putting a bag-shaped outer skin member into a cavity of a mold, pouring a foamable liquid material into the skin member and curing the material.

2. Description of the Prior Art

Hitherto, in the field of seat manufacturing, a so-called "skin-covered foamed plastic pad" has been widely used as a cushion member of a seat cushion and/or a seatback. Usually, the pad is produced by pouring a foamable liquid material into a bag-shaped outer skin member which has been held in a mold and thereafter curing the same in a suitable manner.

Among various outer skin members, there is a type which comprises an outer layer of fabric and an inner layer of foamed plastic sheet, such as laminated urethane foam or the like, lined on an inner surface of the outer layer. When, however, such type skin member is used when producing the skin-covered foamed plastic pad, it tends to occur that the outer skin of the product fails to have uniform hardness and/or flexibility therethroughout. This is because, upon application of the foamable material into the bag-shaped outer skin member of such type, the material penetrates into the inner layer but unevenly causing uneven impregnation of the material in the outer skin member therethroughout. In fact, the urethane foam laminate is of a porous material permitting penetration of the liquid material thereinto.

SUMMARY OF THE INVENTION

It is therefore an object of the present invention to provide a method of producing a skin-covered foamed plastic article, which method is free of the above-mentioned drawback.

According to the present invention, there is provided a method of producing a skin-covered foamed plastic article, which comprises by steps preparing a lower mold which has a cavity formed therein; putting a bag-shaped outer skin member into the cavity, the skin member having a porous inner layer; pouring a foamable material for the foamed plastic article into the bag-shaped outer skin member; and controlling a pressure in the cavity in such a manner that the inner layer becomes saturated to a predetermined degree during curing of the material.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
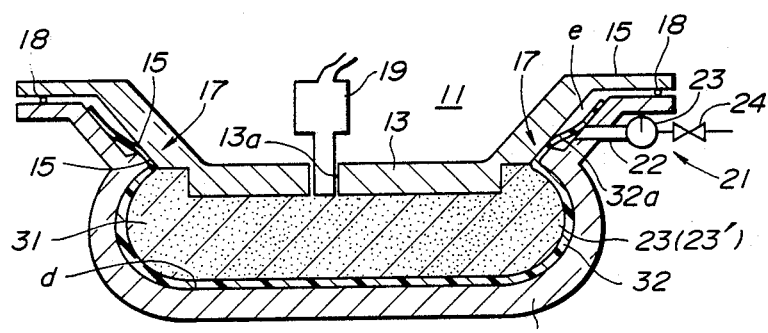
FIG. 1 is a sectional view of a mold assembly used in a method according to the present invention.

Referring to FIG. 1, there is shown a mold assembly 11 which is used in the method of the present invention. The mold assembly 11 comprises a lower mold 12 having a cavity "d" which is shaped to match with the contour of the pad to be produced, and an upper mold 13 which is to be put on the lower mold 12 in such a manner as shown. Although not shown in the drawing, if necessary, a suitable core mold may be used.

Denoted by numeral 17 is a skin member retaining portion which is defined by respective mating portions 15 of the lower and upper molds 12 and 13. That is, upon molding, the mating portions 15 put therebetween a peripheral edge portion 32a of an outer skin member 32 for retaining the same relative to the mold assembly 11. A packing 18 is seated on an outer peripheral flat portion of the lower mold 12 for achieving sealing between the two molds 12 and 13. The upper mold 13 is formed with a bore 13a into which an pouring head 19 of foamable material feeder (not shown) is insertable from the outside.

The lower mold 12 is equipped with a pressure control device 21 in order to control a pressure within the cavity "d" of the mold 12. The pressure control device 21 comprises a pipe 22 exposed to an enclosed space "e" defined by the mating portions 15 of the molds 12 and 13 and the packing 18. It is to be noted that the space "e" is freely communicated with the cavity "d" through mating portions 15. The pressure control valve 24 further comprises a pressure gauge 23 and a valve 24 which are connected to the pipe 22.

In the following, the steps for producing a skin-covered foamed plastic pad will be described.

First, a bag-shaped outer skin member 32 is put into the cavity "d" of the lower mold 12 having the peripheral edge portion 32a thereof seated on the mating portion 15 of the lower mold 12, and then the upper mold 13 is put on the lower mold 12 in such as manner as is shown in FIG. 1. The outer skin member 32 is of the above-mentioned type, viz, the type which comprises an outer layer 33 of fabric or plastic and an inner layer 34 of porous foamed plastic sheet, such as laminated urethane foam or the like, lined on a back surface of the outer layer 33. Preferably, the inner layer 34 is of a porous urethane foam sheet having a thickness ranging from about 2 mm to about 20 mm.

Then, the pouring head 19 of the material feeder is mated with the bore 13a of the upper mold 13 and a liquid foamable material for a foamed polyurethane is poured into the bag-shaped outer skin member 32. For the reason as has been mentioned hereinafore, part of the liquid material penetrates into the porous inner layer 34 of the outer skin member 32, and foaming of the material starts gradually.

While the valve 24 is kept closed, the pressure in the cavity "d", more specifically, the pressure in the enclosed space "e" is gradually increased due to the gradual foaming of the material.

Experiment has revealed that the penetration of the material into the inner layer 34 is evenly achieved when the curing of the material is carried out under a certain condition in pressure.

Figure 2:
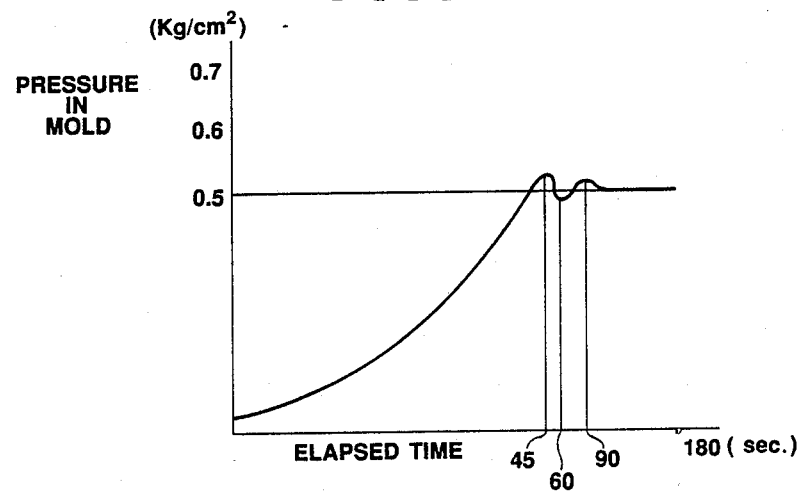
FIG. 2 is a graph depicting the concept of a first embodiment of the present invention, which graph shows a relationship between the pressure created in a mold and the time elapsed from the time when foaming of a material in the mold begins.
Figure 3:
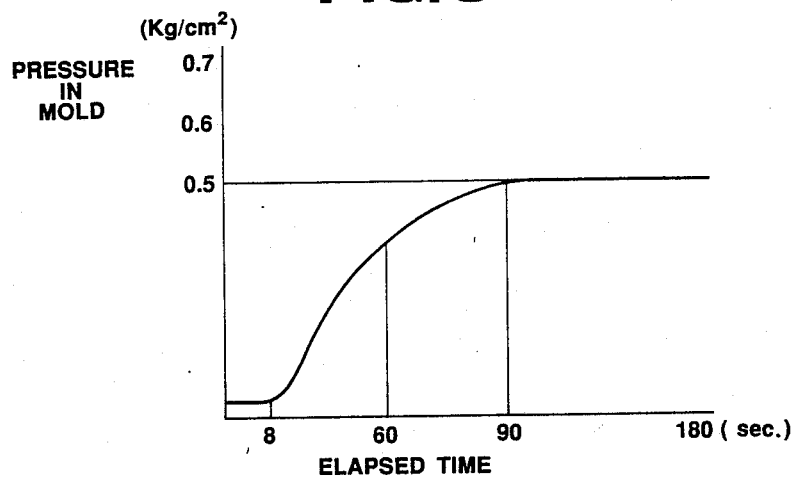
FIG. 3 is a graph similar to FIG. 2, but depicting the conept of a second embodiment of the present invention.

FIGS. 2 and 3 show the results of two experiments which were carried out by the inventors using a porous urethane laminate of about 15 mm in thickness as the inner layer 34.

In the first experiment depicted by the graph of FIG. 2, the valve 24 was kept closed until the pressure in the cavity "d" increased to the value of about 0.5 Kg/cm². Upon this, the valve 24 was opened. More specifically, when about 45 seconds elapsed after pouring of the material into the enclosed cavity "d", the pressure in the cavity "d" exhibited about 0.5 Kg/cm². Upon this, the valve 24 was opened to discharge excessive gas into the open air. The pressure thereafter reduced gradually for about 15 seconds but thereafter the same increased gradually for about 30 seconds and finally settled to a value of about 0.5 Kg/cm², as shown. The foaming of the material was settled about 180 seconds from the material pouring. The product provided by this experiment was free of the defect which the product provided by the above-mentioned conventional method have.

In the second experiment depicted by the graph of FIG. 3, the valve 24 was kept opened for a given time after the material pouring and then the valve 24 was closed. That is, as is understood from the graph, the valve 24 was kept opened until about 8 seconds elapsed after the material pouring. During this period, there was no pressure increase in the cavity "d". Then, the valve 24 was closed. The pressure thereafter gradually increased and finally settled to a value of about 0.5 Kg/cm² at the time of about 90 seconds elapsed. The product provided by this experiment was also free of the defects of the product of the conventional method.

Although the above-description is directed to the steps wherein the upper mold is put on the lower mold before the foamable material is poured into the cavity of the lower mold, the upper mold may be put on the lower mold after the material is poured into the cavity.

What is claimed is:

1. A method of producing a skin-covered foamed plastic article, comprising the steps of:
   (a) preparing a lower mold which has a cavity formed therein;
   (b) putting a bag-shaped outer skin member into said cavity, said skin member having a porous inner layer;
   (c) sealingly closing said cavity;
   (d) pouring a foamable material for the foamed plastic article into the bag-shaped outer skin member, said material being capable of impregnating said inner layer, said material foaming in said cavity and causing pressure in said cavity to gradually increase;
   (e) curing said material to provide said article;
   (f) allowing pressure in said cavity to increase to a first pressure;
   (g) venting gas in said cavity after said first pressure is attained so that a second, lower pressure results; and
   (h) allowing pressure in said cavity to return to said first pressure after venting, thereby controlling said pressure such that said curing is carried out under a certain pressure condition which will provide for even penetration of said material into said inner layer.

2. A method as claimed in claim 1, in which said first pressure is approximately 0.5 kg/cm².

3. A method as claimed in claim 2, in which said inner layer is a foamed material.

4. A method as claimed in claim 3, in which said foamable material is a liquid material for foamed polyurethane.

5. A method as claimed in claim 1 in which gas is vented after about 45 seconds after said foamable material is poured.

6. A method of producing a kin-covered foamed plastic article, comprising the steps of:
   (a) preparing a lower mold which has a cavity formed therein;
   (b) putting a bag-shaped outer skin member into said cavity, said skin member having a porous inner layer;
   (c) sealingly closing said cavity;
   (d) pouring a foamable material for the foamed plastic article into the bag-shaped outer skin member, said material being capable of impregnating said inner layer;
   (e) curing said material to provide said article;
   (f) allowing said foamable material to foam without an increase in pressure by venting gas from said cavity during an initial predetermined period of time; and
   (g) then allowing pressure in said cavity to increase after said initial period of time such that said curing is carried out under a certain pressure condition which will provide for even penetration of said material into said inner layer.

7. A method as claimed in claim 6, in which said initial predetermined period of time is about 8 seconds.

8. A method as claimed in claim 6, wherein said foamable material is a liquid material for foamed polyurethane.

9. A method as claimed in claim 6, wherein said inner layer is a foamed material.

* * * * *